United States Patent [19]

Miyakawa et al.

[11] Patent Number: 5,117,873
[45] Date of Patent: Jun. 2, 1992

[54] BLADDER EDGE SEAL AND HOLDER FOR HYDRAULIC FLUID PRESSURE ACCUMULATOR

[75] Inventors: Yoshitaka Miyakawa; Kenji Hattori, both of Tochigi, Japan

[73] Assignee: Honda Giken Kogyo Kabushiki Kaisha, Tokyo, Japan

[21] Appl. No.: 601,091

[22] Filed: Oct. 22, 1990

[51] Int. Cl.⁵ .............................................. F16L 55/04
[52] U.S. Cl. ..................... 138/30; 220/530; 220/721; 417/540
[58] Field of Search ............ 138/26, 30; 220/85 B; 417/540

[56] References Cited

U.S. PATENT DOCUMENTS

| | | | |
|---|---|---|---|
| 2,889,078 | 6/1959 | Thomas | 220/85 B |
| 3,230,975 | 1/1966 | Mercier | 138/30 |
| 3,256,911 | 6/1966 | Mercier et al. | 138/30 |
| 3,494,378 | 2/1970 | Greer | 138/30 |
| 3,929,163 | 12/1975 | Schön | 138/30 |
| 3,931,834 | 1/1976 | Caillet | 138/30 |
| 4,543,997 | 10/1985 | Kishimoto | 138/30 |
| 4,595,037 | 6/1986 | LeBreton et al. | 138/30 |
| 4,777,982 | 10/1988 | Borowitz et al. | 138/30 |
| 4,777,983 | 10/1988 | Steveley | 138/30 |
| 4,793,381 | 12/1988 | Sugimura | 220/85 B |

Primary Examiner—James E. Bryant, III
Attorney, Agent, or Firm—Armstrong, Nikaido, Marmelstein, Kubovcik & Murray

[57] ABSTRACT

A bladder-type accumulator includes a hollow housing having an inner wall surface including a cylindrical surface of a predetermined width, a sheet-like elastically flexible bladder disposed in the hollow housing and dividing an interior space of the hollow housing into a first fluid chamber and a second fluid chamber and a holder which holds a peripheral edge of the bladder against the cylindrical surface of the hollow housing. The peripheral edge of the bladder is shaped such that a relatively large pressure will be applied to at least a partial annular area, having a predetermined width, of the bladder along the peripheral edge thereof.

25 Claims, 5 Drawing Sheets

BLADDER EDGE SEAL AND HOLDER FOR HYDRAULIC FLUID PRESSURE ACCUMULATOR

BACKGROUND OF THE INVENTION

1. Field of the Invention

The present invention relates to a bladder-type accumulator.

2. Description of the Relevant Art

Fluid circuits such as hydraulic pressure circuits, for example, employ an accumulator as an auxiliary hydraulic pressure source for accumulating a fluid such as working oil under pressure. Such an accumulator generally comprises a hollow housing with its interior space being divided into a back pressure chamber and a reservoir chamber by a bladder made of a flexible material such as rubber. The back pressure chamber is filled with a nitrogen gas under high pressure, and the oil is stored under pressure in the reservoir chamber. The bladder has its periphery pressed against the inner wall surface of the housing by an annular holder, hermetically sealing the back pressure chamber and the reservoir chamber from each other.

However, the accumulator of the above type is disadvantageous that the nitrogen gas filled under high pressure in the back pressure chamber may leak through the pressed region where the bladder is pressed against the inner wall surface of the housing or the bladder is held by the holder, into the reservoir chamber where the nitrogen gas may dissolve into the oil in the reservoir chamber. Especially if the bladder is made of rubber, the nitrogen gas filled under high pressure in the back pressure chamber is inevitably permeated through the bladder and dissolved into the oil in the reservoir chamber. When such permeation leakage occurs at the same time the leakage through the pressed region, the performance of the accumulator is impaired.

SUMMARY OF THE INVENTION

In view of the aforesaid problems of the conventional bladder-type accumulators, it is an object of the present invention to provide a bladder-type accumulator which minimizes the amount of a gas which leaks from a back pressure chamber through a pressed region where a bladder is pressed against a housing or held by a holder, or through the bladder itself, into a reservoir chamber.

According to the present invention, there is provided an accumulator comprising a hollow housing having an inner wall surface including a cylindrical surface of a predetermined width, a sheet-like elastically flexible bladder disposed in the hollow housing and dividing an interior space of the hollow housing into a first fluid chamber and a second fluid chamber, and a holder which holds a peripheral edge of the bladder against the cylindrical surface of the hollow housing such that a relatively large pressure will be applied to at least a partial annular area, having a predetermined width, of the bladder along the peripheral edge thereof.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Like or corresponding parts are denoted by like or corresponding reference numerals throughout views.

Figure 1:
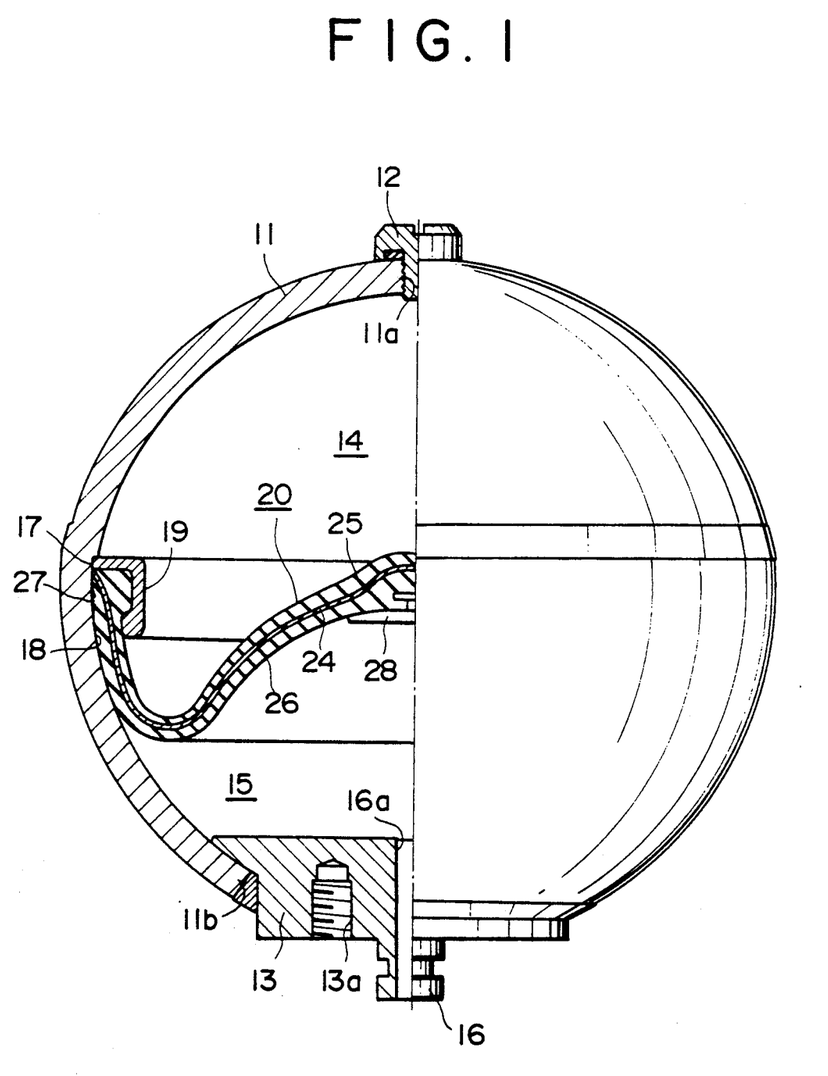
FIG. 1 is an elevational view, partly in cross section, of a bladder-type accumulator according to a first embodiment of the present invention.

FIG. 1 shows, partly in cross section, a bladder-type accumulator according to a first embodiment of the present invention. As shown in FIG. 1, the bladder-type accumulator includes a hollow, substantially spherical housing 11 of a unitary construction which may be fabricated by a drawing process, and a bladder 20 disposed in the housing 11. The housing 11 has a gas inlet port 11a defined in an upper wall portion thereof, with a plug 12 being hermetically fitted in the gas inlet port 11a. The housing 11 also has an opening 11b defined in a lower wall portion thereof, with a plug 13 being fitted in the opening 11b and welded to its peripheral edge in a liquid-tight sealed condition against oil leakage. The gas inlet port 11a opens into a back pressure chamber 14 in the housing 11, and is connected to a gas inlet pipe (not shown) when a gas is introduced into the back pressure chamber 14. The plug 13 has a nipple 16 which defines a passage 16a opening into a reservoir chamber 15 defined in the housing 11, the nipple 16 being connected to an oil pipe (not shown) The plug 13 also has a threaded hole 13a defined in an outer surface thereof, for attachment of the accumulator to a support member (not shown).

The housing 11 has an annular step surface 17 on its inner wall surface, the annular step surface 17 being positioned substantially intermediate in a vertical direction (as shown). The annular step surface 17 faces downwardly along its entire circumferential length. The inner wall surface of the housing 11 also includes a cylindrical surface 18 extending vertically over a certain range or width downwardly from the annular step surface 17 in perpendicular relation thereto. The cylindrical surface 18 is of an annular shape and has a constant diameter over its vertical extent or width.

The bladder 20 has an annular peripheral edge pressed against the cylindrical surface 18 by an annular holder 19 which is held against the annular step surface 17. The interior space of the housing 11 is divided vertically into the back pressure chamber 14 and the reservoir chamber 15 by the bladder 20. The back pressure chamber 14 is filled with a nitrogen gas under high pressure which has been introduced through the gas inlet port 11a that is subsequently closed by the plug 12. Working oil is filled under pressure in the reservoir chamber 15, which is connected through the nipple 16 to a hydraulic circuit (not shown) so that working oil under pressure can flow into and out of the reservoir chamber 15.

Figure 2:
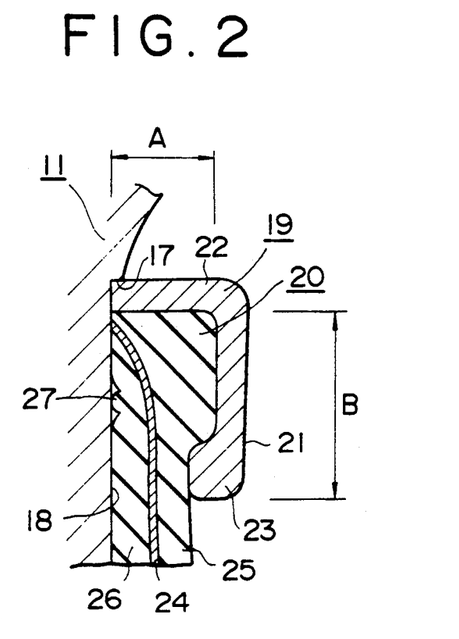
FIG. 2 is an enlarged fragmentary cross-sectional view showing the manner in which a bladder is held against a housing by a holder in the bladder-type accumulator shown in FIG. 1.
Figure 16:
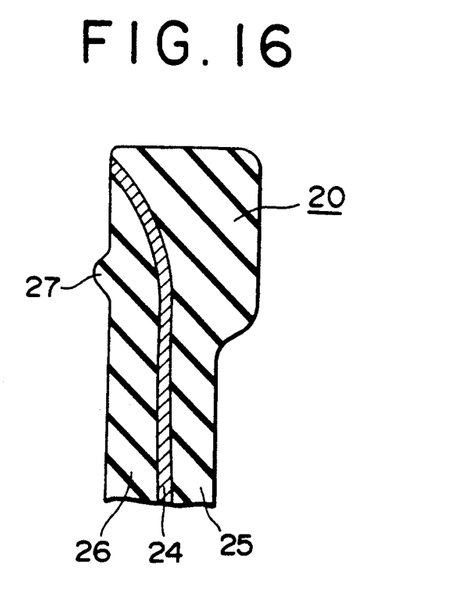
FIG. 16 is an enlarged fragmentary cross-sectional view of a peripheral edge of the bladder before it is held against the housing by the holder shown in FIG. 2.

As shown in FIG. 2, the holder 19 comprises an annular flange 22 pressed into or held against the annular step surface 17 and the cylindrical surface 18 in perpendicular relation to the latter, and a tubular portion 21 extending downwardly from an inner peripheral end of the flange 22 substantially parallel to the cylindrical surface 18. The holder 19 is therefore of a hook-shaped or inverted L-shaped cross section. The tubular portion 21 has an integral annular retainer ridge 23 projecting radially outwardly (toward the cylindrical surface 18) from the lower end of the tubular portion 21. It is preferable that the tubular portion 21 have a vertical dimension B which is about three through five times the radial dimension A of the flange 22, and substantially equal to the vertical extent or width of the cylindrical surface 18 of the housing 11. When the flange 22 of the holder 19 is fitted against the cylindrical surface 18 and held against the step surface 17, the retainer ridge 23 of the holder 19 bites into the bladder 20, thereby pressing the peripheral edge of the bladder 20 against the cylindrical surface 18. FIG. 16 shows in enlarged cross section a peripheral edge of the bladder 20 before the bladder 20 is held against the housing 11 by the holder 19.

As shown in FIG. 2, the bladder 20 comprises a sheet-like laminated layer assembly which is constructed of an intermediate non-rubber layer 24 made of synthetic resin or metal foil, and a pair of rubber layers 25, 26 made of an elastic material such as rubber, the rubber layers 25, 26 being bonded or otherwise joined to the respective opposite surfaces of the non-rubber layer 24. The bladder 20 is elastically flexible as a whole. Because of the intermediate non-rubber layer 24, the bladder 20 is impermeable to gases. The layers 24, 25, 26 of the bladder 20 are of substantially identical circular shapes. Particularly, the rubber layers 25, 26 are progressively thicker radially inwardly as shown in FIG. 1.

The peripheral edge of the bladder 20, particularly the peripheral edge of the non-rubber layer 24 which is held against the cylindrical surface 18 by the holder 19, is pressed against the cylindrical surface 18 while being directed toward the outermost edge of the flange 22 and exposed between the peripheral edges of the rubber layers 25, 26. The peripheral edges of the layers 24, 25, 26 are closely held together within a space which is surrounded by the flange 22, the tubular portion 21, and the cylindrical surface 18.

More specifically, the peripheral edge of the rubber layer 25 which faces into the back pressure chamber 14 is of an increased thickness and has a substantial portion held closely or pressed against the holder 19. The peripheral edge of the rubber layer 26 which faces into the reservoir chamber 15, together with the peripheral edge of the non-rubber layer 24, is held closely or pressed against the cylindrical surface 18. The rubber layer 26 has an annular ridge 27 disposed in an outer annular surface area thereof of a certain vertical width which extends along the annular peripheral edge of the rubber layer 26, the annular ridge 27 being positioned laterally or radially outwardly of the tubular portion 21 of the holder 19 and facing toward the cylindrical surface 18 of the housing 11. Since the peripheral edge of the bladder 20 is pressed against the cylindrical surface 18 by the holder 19, the annular ridge 27 is uniformly pressed or held closely against the cylindrical surface 18 under a higher pressure than the pressure under which the other surface area of the rubber layer 26 along the peripheral edge thereof is pressed against the cylindrical surface 18. Accordingly, the portion of the rubber layer 26 in the vicinity of the annular ridge 27 is compressed or compacted, thereby preventing the gas from being permeated and leaked from the back pressure chamber 14 into the reservoir chamber 15 along the cylindrical surface 18.

In operation, the bladder 20 is always biased downwardly under the pressure of the nitrogen gas filled in thee back pressure chamber 14, thus maintaining the working oil reliably and stably under pressure in the reservoir chamber 15. The bladder 20 includes a stopper 28 mounted centrally on the rubber layer 26 and facing into the reservoir chamber 15. The stopper 28 serves to prevent the rubber layer 26 from being forced into the passage 16a when there is not much working oil left in the reservoir chamber 15.

In the first embodiment, the peripheral edge of the bladder 20 is pressed against and retained securely on the cylindrical surface 18 of the housing 11 by the holder 19. As a result, the annular ridge 27 of the bladder 20 is elastically deformed and pressed or held closely against the cylindrical surface 18 under a high pressure. The vertical dimension B of the tubular portion 21 of the holder 19 is so large that the peripheral edge of the bladder 20 is pressed or held intimately against the cylindrical surface 18 over a large vertical range. Accordingly, an effective strong hermetic seal is provided between the bladder 20 and the cylindrical surface 18, thereby minimizing the amount of a nitrogen gas which leaks from the back pressure chamber 14 into the reservoir chamber 15. As described above, the annular ridge 27 and the region of the rubber layer 26 in the vicinity of the annular ridge 27 are compressed, and the retainer ridge 23 of the holder 19 is held in biting engagement with the rubber layer 25 along the peripheral edge thereof. Therefore, the portion of the rubber layer 25 engaged by the retainer ridge 23 is also compressed. The nitrogen gas is thus effectively prevented from being permeated and leaked through these compressed regions of the rubber layers 25, 26. The accumulator according to the first embodiment can maintain its initial performance capabilities over a long period of time.

Figure 3:
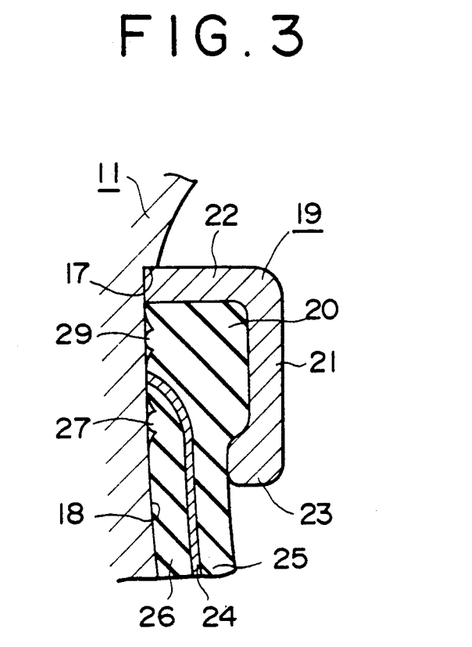
FIG. 3 is an enlarged fragmentary cross-sectional view showing the manner in which a bladder is held against a housing by a holder in a bladder-type accumulator according to a second embodiment of the present invention.

FIG. 3 shows in enlarged fragmentary cross section the manner in which a bladder 20 is held against a housing 11 by a holder 19 in an accumulator according to a second embodiment of the present invention.

As shown in FIG. 3, the peripheral edge of the non-rubber layer 24 is exposed and held against the cylindrical surface 18 of the housing 11. The rubber layer 25 facing into the back pressure chamber 14 has a peripheral edge greater in vertical extent than the peripheral edge thereof shown in FIG. 2, and pressed or held closely against the cylindrical surface 18. The peripheral edge of the rubber layer 25 which is pressed against the cylindrical surface 18 also has an annular ridge 29 extending the full circumferential length of the rubber layer 25, just like the annular ridge 27 on the peripheral edge of the rubber layer 25. The annular ridges 29, 27 are positioned upwardly and downwardly, respectively, of the exposed peripheral edge of the non-rubber layer 24, and are pressed against the cylindrical surface 18 under a high pressure.

Since the annular ridges 27, 29 are pressed in contact with the cylindrical surface 18 under a high pressure, they provide a high hermetic seal between the back pressure chamber 14 and the reservoir chamber 15. Because the annular ridge 29 is pressed under compression in contact with the cylindrical surface 18 under a high pressure in a position closer to the back pressure chamber 14 than the non-rubber layer 24, the nitrogen gas in the back pressure chamber 14 is effectively prevented from entering the mating area where the rubber layer 26 and the non-rubber layer 24 mate with each other. Consequently, the nitrogen gas is prevented from being permeated and leaked through the mating area and the rubber layer 26 into the reservoir chamber 15.

Figure 4:
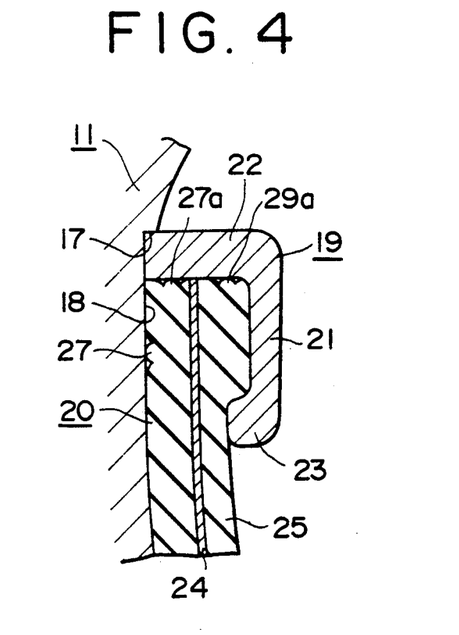
FIG. 4 is an enlarged fragmentary cross-sectional view showing the manner in which a bladder is held against a housing by a holder in a bladder-type accumulator according to a third embodiment of the present invention.

FIG. 4 shows in enlarged fragmentary cross section the manner in which a bladder 20 is held against a housing 11 by a holder 19 in an accumulator according to a third embodiment of the present invention.

As shown in FIG. 4, the peripheral edge of the non-rubber layer 24 is exposed and held against the flange 22 of the holder 19. The rubber layers 25, 26 which sandwich the non-rubber layer 24 therebetween have respective peripheral edges held against the flange 22 and having respective annular ridges 29a, 27a, which are pressed or held closely against the flange 22 under a high pressure. The rubber layer 27 also has an annular layer 27, as is the case with the previous embodiments, along the peripheral edge thereof. The annular ridge 27 is pressed or held closely against the cylindrical surface 18.

The bladder which is thus pressed against the housing 11 by the holder 19 is effective in preventing the permeation and leakage of the nitrogen gas from the back pressure chamber into the reservoir chamber.

Figure 5:
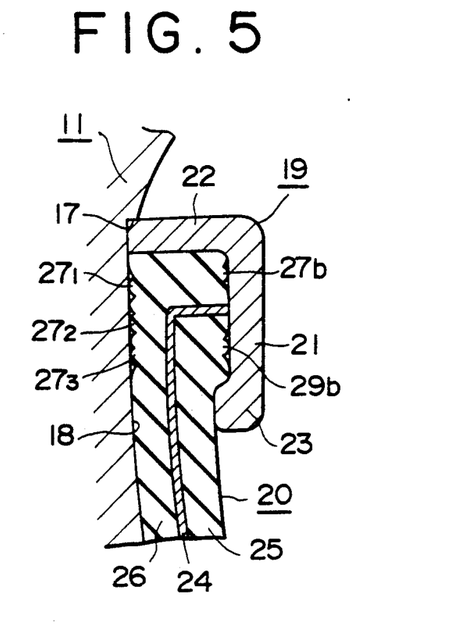
FIG. 5 is an enlarged fragmentary cross-sectional view showing the manner in which a bladder is held against a housing by a holder in a bladder-type accumulator according to a fourth embodiment of the present invention.

FIG. 5 shows in enlarged fragmentary cross section the manner in which a bladder 20 is held against a housing 11 by a holder 19 in an accumulator according to a fourth embodiment of the present invention.

As shown in FIG. 5, the peripheral edge of the non-rubber layer 24 is exposed and held against the tubular portion 21 of the holder 19. The peripheral edge of the rubber layer 26 is increased in thickness, and is also pressed or held closely against the tubular portion 21. The peripheral edge of the rubber layer 26 has an annular ridge 27b extending the full circumferential length thereof. The rubber layer 26 further has a plurality of (three in the illustrated embodiment) parallel annular ridges $27_1$, $27_2$, $27_3$ along the peripheral edge thereof which are pressed or held closely against the cylindrical surface 18. The peripheral edge of the rubber layer 25 also has an annular ridge 29b which is pressed or held closely against the tubular portion 21.

The bladder 20 according to the fourth embodiment is effective to prevent the permeation and leakage of the nitrogen gas from the back pressure chamber into the reservoir chamber because the annular ridges $27_1$, $27_2$, $27_3$ of the rubber layer 26 are pressed or held closely against the cylindrical surface 18 under a high pressure and the annular ridges 29b, 27b of the respective rubber layers 25, 26 are pressed or held closely against the tubular portion 21 under a high pressure, on both sides of the non-rubber layer 24.

Figure 6:
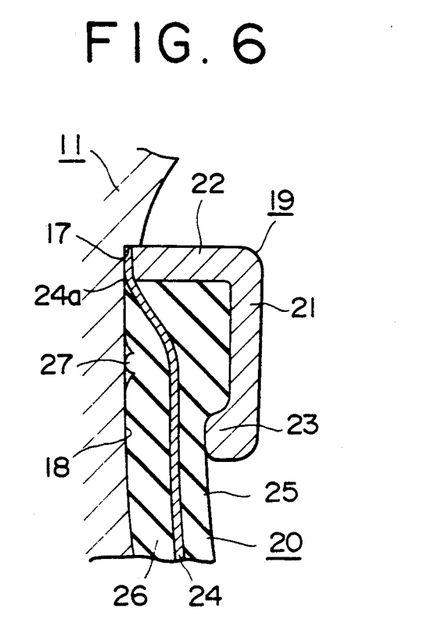
FIG. 6 is an enlarged fragmentary cross-sectional view showing the manner in which a bladder is held against a housing by a holder in a bladder-type accumulator according to a fifth embodiment of the present invention.

FIG. 6 shows in enlarged fragmentary cross section the manner in which a bladder 20 is held against a housing 11 by a holder 19 in an accumulator according to a fifth embodiment of the present invention.

According to the fifth embodiment shown in FIG. 6, the non-rubber layer 24 has a peripheral edge 24a gripped between the outermost end of the flange 22 of the holder 19 and the cylindrical surface 18, and held in abutment against the annular step surface 17. Thus, the peripheral edge 24a has three surfaces pressed by the holder 19, the cylindrical surface 18, and the annular step surface 17, respectively. The peripheral edge 24a is bonded by an adhesive to the cylindrical surface 18, the step surface 17, and the flange 22. As with the previous embodiments, the rubber layer 26 has an annular ridge 27 along the peripheral edge thereof, which is pressed intimately against the cylindrical surface 18.

Since the rubber layers 25, 26 are not present between the cylindrical surface 18 of the housing 11 and the flange 22 of the holder 19, the holder 19 is more securely fixed to the housing 11 with a stronger hermetic seal provided therebetween.

In the fifth embodiment, it is possible to extend the peripheral edge 24a of the non-rubber layer 24 onto the upper surface of the flange 22 and bond the extended peripheral edge 24a to the flange 22 over a larger area with an adhesive for a much stronger hermetic seal.

Figure 7:
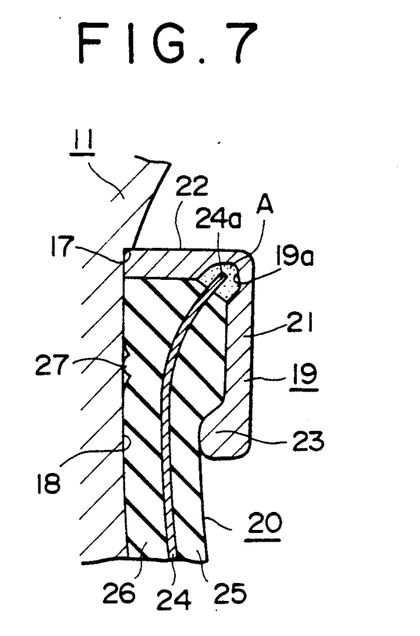
FIG. 7 is an enlarged fragmentary cross-sectional view showing the manner in which a bladder is held against a housing by a holder in a bladder-type accumulator according to a sixth embodiment of the present invention.

FIG. 7 shows in enlarged fragmentary cross section the manner in which a bladder 20 is held against a housing 11 by a holder 19 in an accumulator according to a sixth embodiment of the present invention.

As shown in FIG. 7, the holder 19 has an annular groove 19a defined in a bent corner or junction between the tubular portion 21 and the flange 22 and filled with an adhesive A, and the non-rubber layer 24 has a peripheral edge 24a placed in and securely fastened by the adhesive A in the groove 19a. The rubber layer 26 has an annular ridge 27 along the peripheral edge thereof, which is pressed intimately against the cylindrical surface 18.

The bonded peripheral edge 24a gives a stronger hermetic seal to the mating region where the non-rubber layer 24 and the rubber layers 25, 26 mate with each other, so that the permeation and leakage of the nitrogen gas are prevented more reliably.

In the fifth and sixth embodiments, the peripheral edge of the non-rubber layer 24 is extended from the rubber layers 25, 26 and firmly bonded to both the housing 11 and the holder 19 or the holder 19, thus providing a higher hermetic sealing capability. Furthermore, the bladder 20 is attached to the holder 19 and the housing 11 with higher reliability.

Figure 8:
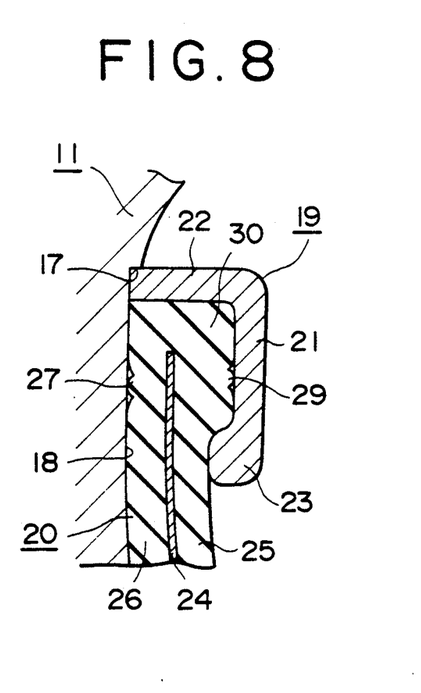
FIG. 8 is an enlarged fragmentary cross-sectional view showing the manner in which a bladder is held against a housing by a holder in a bladder-type accumulator according to a seventh embodiment of the present invention.

FIG. 8 shows in enlarged fragmentary cross section the manner in which a bladder 20 is held against a housing 11 by a holder 19 in an accumulator according to a seventh embodiment of the present invention.

As illustrated in FIG. 8, both the rubber layers 25, 26 have peripheral edges extending beyond the peripheral edge of the non-rubber layer 24. The peripheral edges of the rubber layers 25, 26 are integral with each other beyond the peripheral edge of the non-rubber layer 24, which is thus embedded in the integrally joined peripheral edges of the rubber layers 25, 26. The joined peripheral edges of the rubber layers 25, 26 serve as a covering member 30 which covers the peripheral edge of the non-rubber layer 24. The rubber layers 25, 26 have respective annular ridges 29, 27 extending along the covering member 30 and disposed in regions sandwiching the peripheral edge of the non-rubber layer 26 therebetween. The annular ridges 29, 27 are pressed against the tubular portion 21 and the cylindrical surface 18, respectively, under a high pressure.

According to the seventh embodiment, the peripheral edges of the rubber layers 25, 26 are integral with each other as the covering member 30 which covers the peripheral edge of the non-rubber layer 24. The non-rubber layer 24 is therefore prevented from being peeled off the rubber layers 25, 26 by the covering member 30. The covering layer 30 also effectively minimizes the amount of nitrogen gas which enters the mating region where the non-rubber layer 24 mates with the rubber layer 26, so that any permeation and leakage of the nitrogen gas are prevented from occurring.

Figure 9:
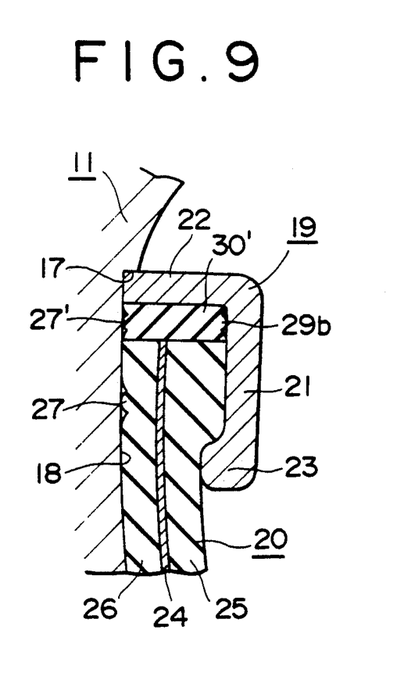
FIG. 9 is an enlarged fragmentary cross-sectional view showing the manner in which a bladder is held against a housing by a holder in a bladder-type accumulator according to an eighth embodiment of the present invention.

FIG. 9 shows in enlarged fragmentary cross section the manner in which a bladder 20 is held against a housing 11 by a holder 19 in an accumulator according to an eighth embodiment of the present invention.

As shown in FIG. 9, an annular rubber sheet (covering member) 30' is bonded by an adhesive to the peripheral edge of the bladder 20, the annular rubber sheet being made of essentially the same material as that of the rubber layers 25, 26. The non-rubber layer 24 has a peripheral edge exposed at the peripheral edge of the bladder 20 to which the rubber sheet 30' is bonded. Thus, the peripheral edges of the layers 24, 25, 26 are bonded to the rubber sheet 30'. The rubber sheet 30' has an annular ridge 27' on its outer circumferential surface confronting the cylindrical surface 18, and an annular ridge 29b on its inner circumferential surface confronting the tubular portion 21. These annular ridges 27', 29b are pressed intimately against the cylindrical surface 18 and the tubular portion 21. The rubber layer 26 itself has an annular ridge 27 which is pressed closely against the cylindrical surface 18.

In the eighth embodiment shown in FIG. 8, the non-rubber layer 24 is prevented from being peeling off the rubber layers 25, 26 by the rubber sheet 30', and the entry of the nitrogen gas into the mating region where the non-rubber layer 24 and the rubber layer 26 mate with each other, due to permeation and leakage, is held to a minimum. Since the rubber sheet 30', which is separate from the bladder 20, has the annular ridges 27', 29b, it is not necessary to form a plurality of annular ridges on the bladder 20 itself, and hence the process of fabricating the bladder 20 is simplified.

Figure 10:
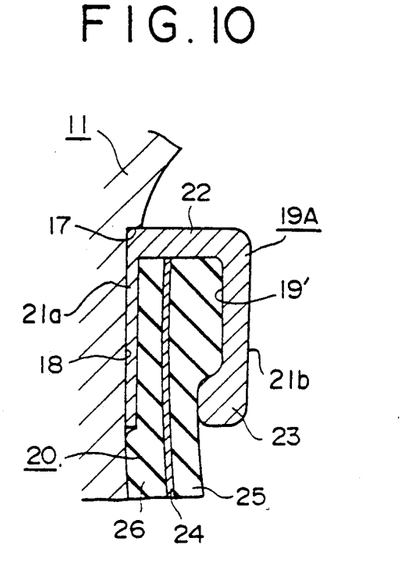
FIG. 10 is an enlarged fragmentary cross-sectional view showing the manner in which a bladder is held against a housing by a holder in a bladder-type accumulator according to a ninth embodiment of the present invention.

FIG. 10 shows in enlarged fragmentary cross section the manner in which a bladder 20 is held against a housing 11 by a holder 19A in an accumulator according to a ninth embodiment of the present invention.

As shown in FIG. 10, the holder 19A comprises an inverted channel-shaped annular member of metal, and has an annular attachment groove 19' opening downwardly. More specifically, the holder 19A comprises an annular flange 22 and a pair of radially outer and inner tubular portions 21a, 21b which extend downwardly at a right angle from respective radially outer and inner edges of the flange 22. The outer and inner tubular portions 21a, 21b therefore form a double-walled construction. The annular attachment groove 19' is defined between the outer and inner tubular portions 21a, 21b and closed at its upper end by the flange 22. The inner tubular portion 21b has an integral annular retainer ridge 23 projecting radially outwardly (toward the cylindrical surface 18) from the lower end of the tubular portion 21b. As with the holder 19 according to the previous embodiments, the holder 19A is force-fitted against the annular cylindrical surface 18 of the housing 11, and the outer tubular portion 21a is held against the cylindrical surface 18 with the upper surface of the flange 22 being in abutment against the step surface 17. The peripheral edge of the bladder 20 is fitted in the annular attachment groove 19' in the holder 19A, and the retainer ridge 23 is held in biting engagement with the rubber layer 25 of the bladder 20. The holder 19A may not force-fitted against the cylindrical surface 18, but may be bonded to the cylindrical surface 18 and the step surface 17 by an adhesive.

In the ninth embodiment, the outer tubular portion 21a of the metallic holder 19A is fitted against the cylindrical surface 18 over a wide area thereof, and the peripheral edge of the bladder 20 is fitted in the attachment groove 19' and held closely against the holder 19A over a wide area thereof, thereby providing a strong hermetic seal between the housing 11, the holder 19A, and the bladder 20. Any nitrogen gas which may leak from the junctions between the cylindrical surface 18, the holder 19A, and the bladder 20 is thus minimized. Inasmuch as the peripheral edges of all the layers 24, 25, 26 of the bladder 20 are pressed or held closely against the flange 22 at the deepest end of the attachment groove 19', the amount of a nitrogen gas which enters the mating region where the non-rubber layer 24 mates with the rubber layer 25 or the rubber layer 26 is very small, and the nitrogen gas is prevented from passing through the rubber layer 26 and leaking into the reservoir chamber 15.

Figure 11:
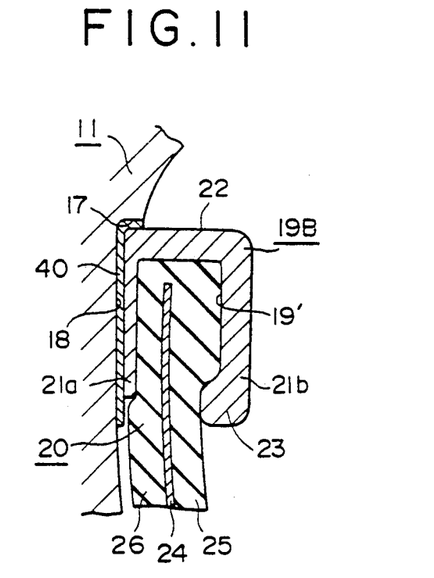
FIG. 11 is an enlarged fragmentary cross-sectional view showing the manner in which a bladder is held against a housing by a holder in a bladder-type accumulator according to a tenth embodiment of the present invention.

FIG. 11 shows in enlarged fragmentary cross section the manner in which a bladder 20 is held against a housing 11 by a holder 19B in an accumulator according to a tenth embodiment of the present invention.

The tenth embodiment illustrated in FIG. 11 differs from the ninth embodiment shown in FIG. 10 partly in that an annular rubber band 40 made of an elastic material such as rubber is bonded to the cylindrical surface 18 and the step surface 17. The outer tubular portion 21a and the flange 22 of the holder 19B, which is similar to the holder 19A shown in FIG. 10, are force-fitted and bonded at their outer circumferential surfaces to the rubber band 40 by an adhesive. Therefore, the holder 19B is secured to the cylindrical surface 18 through the rubber band 40. The rubber band 40 has a vertical dimension larger than that of the holder 19B.

As is the case with the seventh embodiment (FIG. 8), the peripheral edges of the rubber layers 25, 26 are the peripheral edges of the rubber layers 25, 26 are integrally joined to each other over the peripheral edge of the non-rubber layer 24, so that the non-rubber layer 24 is embedded in the rubber layers 25, 26.

With the tenth embodiment, any leakage of nitrogen gas from the mating regions where the holder 19B, the housing 11, and the bladder 20 mate with each other is also reduced.

Figure 12:
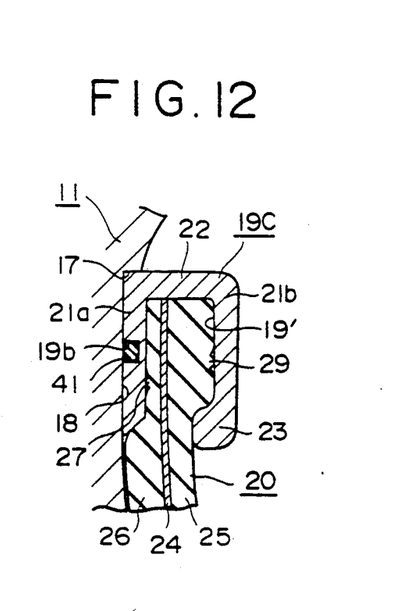
FIG. 12 is an enlarged fragmentary cross-sectional view showing the manner in which a bladder is held against a housing by a holder in a bladder-type accumulator according to an eleventh embodiment of the present invention.

FIG. 12 shows in enlarged fragmentary cross section the manner in which a bladder 20 is held against a housing 11 by a holder 19C in an accumulator according to an eleventh embodiment of the present invention.

The holder 19C shown in FIG. 12 is of substantially the same configuration as that of the holder 19A shown in FIG. 10. However, the outer tubular portion 21a of the holder 19C has an annular sealing groove 19b defined in its outer circumferential surface, and a seal element 41 is disposed in the sealing groove 19b. The holder 19C is fitted against the cylindrical surface 18 through the seal element 41 disposed in the sealing groove 19b. The rubber layers 25, 26 inserted in the attachment groove 15' in the holder 19C have respective annular ridges 29, 27 which are pressed against the inner and outer tubular portions 21b, 21a of the holder 19C under a high pressure.

In the eleventh embodiment, the holder 19C is intimately held against the cylindrical surface 18 through the seal 41, and the peripheral edge of the bladder 20 is fully fitted in the attachment groove 19' and intimately held against the holder 19C through the ridges 27, 29. Therefore, the housing 11, the bladder 20, and the holder 19C are securely held together with a strong hermetic seal.

Figure 13:
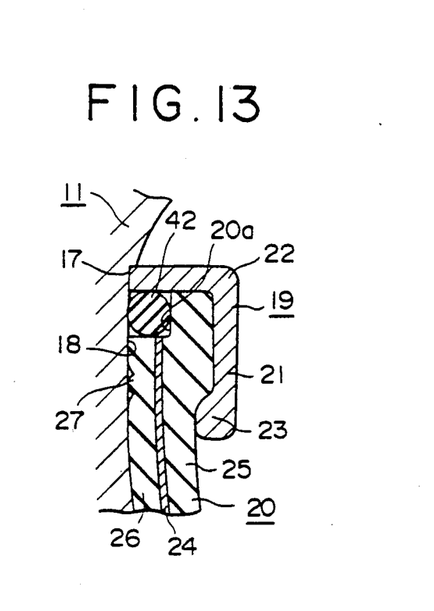
FIG. 13 is an enlarged fragmentary cross-sectional view showing the manner in which a bladder is held against a housing by a holder in a bladder-type accumulator according to a twelfth embodiment of the present invention.

FIG. 13 shows in enlarged fragmentary cross section the manner in which a bladder 20 is held against a housing 11 by a holder 19 in an accumulator according to a twelfth embodiment of the present invention.

The holder 19 shown in FIG. 13 is of the same structure as that of the holder 19 shown in FIG. 2. The bladder 20 has a sealing groove 20a of a rectangular cross section which is defined in the peripheral edge thereof and extends the full circumferential length of the bladder 20. The sealing groove 20a is defined in the rubber layer 25, the non-rubber layer 24, and the rubber layer 26. A seal element 42 is fitted in the sealing groove 20a, and is held in intimate contact with the cylindrical surface 18, the flange 22, and at least the rubber layers 25, 26 of the bladder 20.

A ring of hook-shaped cross section may be disposed in the sealing groove 20a and bonded to both of perpendicular surfaces of the sealing groove 20a upon vulcanization or a ring of circular cross section may be disposed in the sealing groove 20a and bonded to one surface of the sealing groove 20a (e.g., the surface of the rubber layer 26) upon vulcanization. The seal element 42 and the bladder 20 may be coupled together through the ring.

Figure 14:
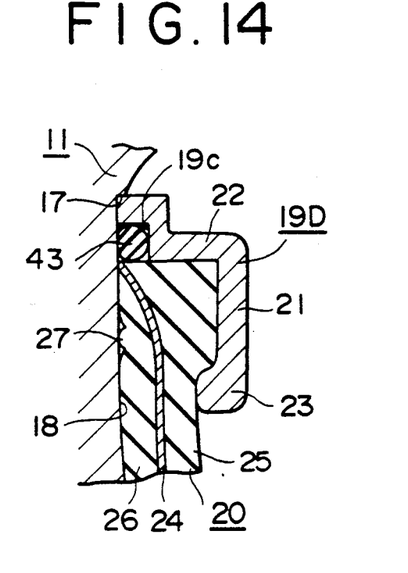
FIG. 14 is an enlarged fragmentary cross-sectional view showing the manner in which a bladder is held against a housing by a holder in a bladder-type accumulator according to a thirteenth embodiment of the present invention.

FIG. 14 shows in enlarged fragmentary cross section the manner in which a bladder 20 is held against a housing 11 by a holder 19D in an accumulator according to a thirteenth embodiment of the present invention.

The holder 19D shown in FIG. 14 is similar in shape to the holder 19 shown in FIG. 2, but the flange 22 thereof has a hook-shaped portion near the cylindrical surface 18, defining an annular sealing groove 19c. A seal element 43 is fitted in the sealing groove 19c and held intimately against the cylindrical surface 18, the flange 22, and the rubber layer 25. Although not shown, a sealing groove may be defined in an annular projection on the outer circumferential surface of the flange 22, which projection is held against the step surface 17 of the housing 11, and a seal element may be positioned in the sealing groove in intimate contact with the step surface 17.

In the above embodiments, except the ninth and tenth embodiments shown in FIGS. 10 and 11, the rubber layer 25 and/or the rubber layer 26 have an integral annular ridge which is pressed or held closely against the housing 11 or the holder 19. According to a fourteenth embodiment shown in FIG. 15, however, the housing 11 and the holder 19 have respective integral ridges 111, 119 projecting toward and pressed against the rubber layers 26, 25, respectively.

Figure 15:
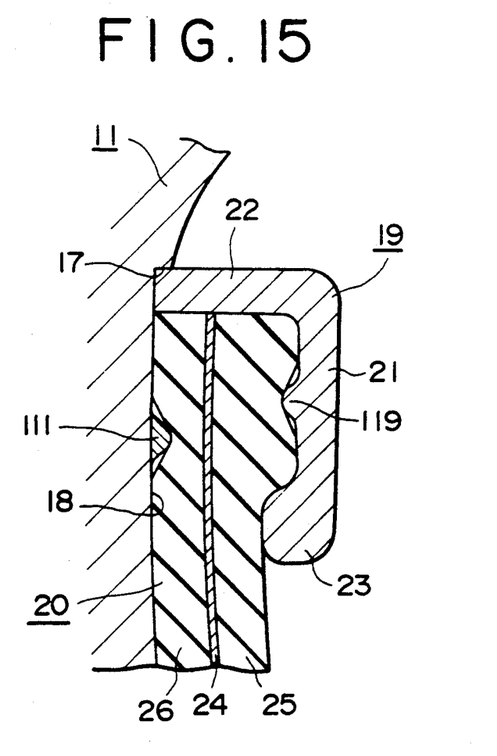
FIG. 15 is an enlarged fragmentary cross-sectional view showing the manner in which a bladder is held against a housing by a holder in a bladder-type accumulator according to a fourteenth embodiment of the present invention.

As shown in FIG. 15, the peripheral edges of all the layers 24, 25, 26 of the bladder 20 are pressed against the flange 22 of the holder 19. The ridge 111 on the cylindrical surface 11 bites into the rubber layer 26 which is elastically deformed under compression, and the ridge 119 on the holder 19 bites into the rubber layer 25 which is elastically deformed under compression.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. An accumulator comprising:
    a hollow housing having an inner wall surface including an inner cylindrical surface of a predetermined width;

an elastically flexible bladder sheet disposed in said hollow housing and dividing an interior space of the hollow housing into a first fluid chamber to be filled with gases and a second fluid chamber to be filled with liquids;

a holder which holds a peripheral edge of said bladder against the inner cylindrical surface of said hollow housing such that a relatively large pressure will be applied to at least a partial annular area, having a predetermined width, of said bladder along said peripheral edge thereof;

said holder having at least a tubular portion including an outer cylindrical surface in parallel with the inner cylindrical surface of said hollow housing;

said bladder sheet having a laminated layer assembly including a first rubber layer facing into said first fluid chamber with a peripheral edge substantially confronting the outer cylindrical surface of said tubular portion, a second rubber layer facing into said second fluid chamber with a peripheral edge confronting the inner cylindrical surface of said hollow housing, and an intermediate gas-impermeable layer sandwiched between said first and second layers;

an annular ridge (27, 111, 119) being provided in at least one of an annular confronting region between the peripheral edge of said first rubber layer and the outer cylindrical surface of said tubular portion or an annular confronting annular region between the peripheral edge of said second rubber layer and the inner cylindrical surface of said hollow housing such that said at least one of the peripheral edges of said first and second rubber layers is partly pressed under compression against its corresponding confronting cylindrical surface by said holder; and a peripheral edge of said intermediate gas-impermeable layer is located closer to the first fluid chamber than the location of said annular ridge (27, 111, 119).

2. An accumulator according to claim 1, wherein said holder includes a retainer ridge projecting toward said inner cylindrical surface of the housing, said retainer ridge being held in biting engagement with said first rubber layer to maintain the first rubber layer under compression at the peripheral edge of said bladder.

3. An accumulator according to claim 2, wherein said second rubber layer comprises at least one of said annular ridge integrally formed thereon in an annular area extending along a peripheral edge thereof, said peripheral edge of the second rubber layer being pressed against said inner cylindrical surface by said holder with said annular integral ridge being partly compressed over an entire circumferential length thereof.

4. An accumulator according to claim 3, wherein said peripheral edge of the bladder is partly pressed against said inner cylindrical surface by said holder with said peripheral edge of the intermediate gas-impermeable layer being held against said inner cylindrical surface.

5. An accumulator according to claim 4, wherein the peripheral edge of said first rubber layer is partly pressed over an entire circumferential length thereof against said inner cylindrical surface by said holder.

6. An accumulator according to claim 5, wherein said peripheral edge of the first rubber layer has an annular integral ridge over the entire circumferential length thereof, said peripheral edge of the first rubber layer being pressed against said inner cylindrical surface by said holder with said annular integral ridge of the first rubber layer being partly compressed over an entire circumferential length of the annular integral ridge of the first rubber layer.

7. An accumulator according to claim 3, wherein said inner wall surface of the housing includes an annular step surface positioned at one edge of the inner cylindrical surface and extending substantially perpendicularly to said inner cylindrical surface over an entire circumferential length thereof, said holder having an annular flange extending radially from an upper peripheral edge of said tubular portion and extending substantially perpendicularly to said inner cylindrical surface and pressed against said inner cylindrical surface and said annular step surface, said tubular portion having said retainer ridge on an end thereof, said peripheral edge of said bladder being held against said inner cylindrical surface by said holder with said retainer ridge being held in biting engagement with said first rubber layer to maintain said first rubber layer under compression.

8. An accumulator according to claim 7, wherein said first and second rubber layers further comprise respective annular ridges along entire circumferential lengths of peripheral edges thereof, said peripheral edges of said first and second rubber layers being pressed against said annular flange of said holder with said respective annular ridges thereof being compressed, and said peripheral edge of said intermediate gas-impermeable layer being also held against said annular flange of said holder therebetween.

9. An accumulator according to claim 7, wherein said first and second rubber layers further comprise respective annular ridges along entire circumferential lengths of peripheral edges thereof, said peripheral edges of said first and second rubber layers being pressed against said outer cylindrical surface of said tubular portion with said respective annular ridges thereof being compressed, and said peripheral edge of said intermediate gas-impermeable layer being also pressed against the outer cylindrical surface therebetween.

10. An accumulator according to claim 9, wherein said second rubber layer has a plurality of parallel annular ridges extending over the entire circumferential length thereof in an annular area of the second rubber layer extending along the peripheral edge thereof, said peripheral edge of the second rubber layer being pressed against said inner cylindrical surface by said holder with said plurality of annular ridges being compressed.

11. An accumulator according to claim 7, wherein said peripheral edge of the intermediate layer is pressed between said annular flange of the holder, said cylindrical wall of the housing, and said annular step surface of the housing.

12. An accumulator according to claim 7, wherein said peripheral edge of the intermediate layer being securely fastened by an adhesive filled in said annular groove of said holder.

13. An accumulator according to claim 7, wherein impermeable first rubber further comprises an annular ridge pressed under compression against said tubular portion of the holder with said intermediate layer being interposed between the annular ridges of said first and second rubber layers, said first and second rubber layers having respective peripheral edges which are integral with each other over a peripheral edge of said intermediate layer, thereby providing said covering member which covers said peripheral edge of the intermediate layer in said holder.

14. An accumulator according to claim 7, further including an annular rubber member bonded to peripheral edges of said first, second, and intermediate layers, said annular rubber member having two annular ridges on respective radially outer and inner circumferential surfaces thereof, said annular ridges being pressed under compression against said inner cylindrical surface of the housing and said outer cylindrical surface of the tubular portion, respectively.

15. An accumulator comprising:
   a hollow housing having an inner wall surface including a cylindrical surface of a predetermined width;
   an elastically flexible bladder sheet disposed in said hollow housing and dividing an interior space of the hollow housing into a first fluid chamber to be filled with gases and a second fluid chamber to be filled with liquids;
   a holder which holds a peripheral edge of said bladder against the cylindrical surface of said hollow housing such that a relatively large pressure will be applied to at least a partial annular area, having a predetermined width, of said bladder along said peripheral edge thereof;
   said bladder sheet having a laminated layer assembly including a first rubber layer facing into said first fluid chamber, a second rubber layer facing into said second fluid chamber, and an intermediate gas-impermeable layer sandwiched between said first and second rubber layers;
   wherein said inner wall surface of the housing includes an annular step surface positioned at one edge of said cylindrical surface and extending substantially perpendicularly to said cylindrical surface over an entire circumferential length thereof, said holder having an annular flange extending substantially perpendicularly to said cylindrical surface and pressed against said cylindrical surface and said annular step surface, a radially outer tubular portion extending downwardly from a radially outer end of said annular flange and pressed against said cylindrical surface, and a radially inner tubular portion extending downwardly from a radially inner end of said annular flange, said peripheral edge of said bladder being sandwiched between said radially outer and inner tubular portions and held against said cylindrical surface by said holder.

16. An accumulator according to claim 15, wherein said second rubber layer comprises an annular area extending along a peripheral edge thereof and pressed under compression against said radially outer tubular portion of the holder over an entire circumferential length of said second rubber layer.

17. An accumulator according to claim 16, wherein said first, second, and intermediate layers have respective peripheral edges pressed against said annular flange of the holder.

18. An accumulator according to claim 16, further including an annular rubber band bonded to said annular step surface and said circumferential surface of the housing, said annular flange and said radially outer tubular portion having radially outer circumferential surfaces pressed against and bonded to said annular rubber band by an adhesive.

19. An accumulator according to claim 18, wherein said first and second rubber layers have respective peripheral edges which are integral with each other over a peripheral edge of said intermediate layer, thereby providing a covering member which covers said peripheral edge of the intermediate layer in said holder.

20. An accumulator according to claim 17, wherein said radially outer tubular portion has an annular groove defined in a surface thereof facing said cylindrical surface, and an annular seal element fitted in said annular groove and pressed against said cylindrical surface.

21. An accumulator according to claim 20, wherein said first and second rubber layers have respective annular ridges pressed under compression against said radially inner and outer tubular portions, respectively, with said intermediate layer being interposed between the annular ridges of said first and second rubber layers.

22. An accumulator comprising:
   a hollow housing having an inner wall surface including a cylindrical surface of a predetermined width;
   an elastically flexible bladder sheet disposed in said hollow housing and dividing an interior space of the hollow housing into a first fluid chamber to be filled with gases and a second fluid chamber to be filled with liquids;
   a holder which holds a peripheral edge of said bladder against the cylindrical surface of said hollow housing such that a relatively large pressure will be applied to at least a partial annular area, having a predetermined width, of said bladder along said peripheral edge thereof;
   said bladder sheet having a laminated layer assembly including a first rubber layer facing into said first fluid chamber, a second rubber layer facing into said second fluid chamber, and an intermediate gas-impermeable layer sandwiched between said first and second rubber layers;
   said peripheral edge of the bladder held by said holder has an annular groove defined in said second rubber layer, said intermediate layer, and a portion of said first rubber layer and extending over entire circumferential lengths of the layers, and further including a seal element fitted in said annular groove and held in intimate contact with at least said cylindrical surface and said first and second rubber layers.

23. An accumulator, comprising:
   a hollow housing having an inner wall surface including a cylindrical surface of a predetermined width;
   an elastically flexible bladder sheet disposed in said hollow housing and dividing an interior space of the hollow housing into a first fluid chamber to be filled with gases and a second fluid chamber to be filled with liquids;
   a holder which holds a peripheral edge of said bladder against the cylindrical surface of said hollow housing such that a relatively large pressure will be applied to at least a partial annular area, having a predetermined width, of said bladder along said peripheral edge thereof;
   said bladder sheet having a laminated layer assembly including a first rubber layer facing into said first fluid chamber, a second rubber layer facing into said second fluid chamber, and an intermediate gas-impermeable layer sandwiched between said first and second rubber layers;
   wherein said holder has an annular groove opening toward at least said cylindrical surface and the peripheral edge of said bladder, and a seal element fitted in said annular groove and held in intimate contact with said cylindrical surface and a peripheral edge of said first rubber layer.

24. An accumulator according to claim 1, wherein said inner wall surface of the housing includes an annular step surface positioned at one edge of the inner cylindrical surface and extending substantially perpendicularly to said inner cylindrical surface over an entire circumferential length thereof, said holder having an annular flange extending radially from an upper peripheral edge of said tubular portion and extending substantially perpendicularly to said inner cylindrical surface and pressed against said inner cylindrical surface and said annular step surface, said tubular portion having a retainer ridge on an end thereof, said peripheral edge of said bladder being held against said inner cylindrical surface by said holder with said retainer ridge being held in biting engagement with said first rubber layer to maintain said first rubber layer under compression, said first, second, and intermediate layers of said bladder having respective peripheral edges pressed against said annular flange of the holder.

25. An accumulator according to claim 24, wherein said tubular portion of the holder has an annular ridge holding an annular area of said first rubber layer along the peripheral edge thereof under compression, and said inner cylindrical surface of the housing has an annular ridge holding an annular area of said second rubber layer along the peripheral edge thereof under compression.

* * * * *